UNITED STATES PATENT OFFICE 2,396,258

LONG CHAIN ALIPHATIC HYDROCARBON COMPOUNDS OF ARSENIC

Ernst A. H. Friedheim, New York, N. Y.

No Drawing. Application December 3, 1942, Serial No. 467,811

2 Claims. (Cl. 260—440)

This invention relates to new aliphatic hydrocarbon compounds of arsenic and has particular relation to saturated long chain aliphatic hydrocarbon compounds of arsenic, which may or may not contain halogen in the molecule. It also relates to compositions containing such compounds.

It is one object of my invention to prepare arsenic-containing hydrocarbon compounds which are highly effective as protecting agents against noxious organisms, and are adapted to be used f. e. as plant protective compositions or protective agents against wood-destroying fungi and insects, termites, teredo navalis and other types of noxious vegetable and animal organisms.

It is another object of my invention to convert halogenated aliphatic hydrocarbon compounds, such as chlorinated petroleum hydrocarbon oils and chlorinated paraffin, into arsenic-containing products.

A further object of my invention is to prepare arsenic-containing hydrocarbon products which are soluble in oils, such as petroleum oils and tar oils.

Other objects and advantages will appear from the following specification and the appended claims.

I have found that new arsenic-containing compounds or compositions of the above mentioned type can be prepared by reacting a liquid, molten, or dissolved saturated, aliphatic hydrocarbon substituted by one or more halogen atoms with a solution of a water-soluble neutral salt of arsenious acid. I prefer the use of hydrocarbons containing mobile halogen atoms. The reaction takes place according to the following general formula:

wherein R denotes a saturated, aliphatic hydrocarbon molecule substituted by halogen atoms (X), and n denotes the number of halogen atoms, i. e. one or more.

The reaction products thus obtained can be reduced to the corresponding trivalent arsenic compounds, such as arsen oxides, arsen dichlorides or arsen sulfides, and also to the corresponding arseno compounds.

Thus, the new compositions according to this invention comprise paraffinic hydrocarbons having a carbon chain of at least 6 carbon atoms, and containing at least one arsenic radical linked to a carbon atom. This arsenic radical is selected from the group consisting of —(AsO₃M₂), wherein M represents hydrogen or another positive component of a water-soluble salt of arsenious acid, —(As=O), —(As=X₂) wherein X represents a halogen atom, —(As=S), and —(As=As)—. In addition to the arsenic radicals, the paraffinic hydrocarbons may also contain one or more halogen atoms.

*Example I.*—Chlorinated paraffin containing about 60% chlorine is introduced in the molten state with vigorous stirring into a 15% aqueous solution containing one mol of sodium arsenite (Na₃AsO₃) for each atom of chlorine. The temperature is kept at 60°–90° C., and stirring is continued for ½ to 6 hours at this temperature, according to the desired degree of arseniation. After the desired time has elapsed, the reaction mixture is allowed to cool, and forms on cooling two layers. The reaction product is separated from the aqueous layer by decanting, and is then washed thoroughly with hot water and alcohol. It represents a brown viscous mass containing the —[AsO(OH)₂] group linked to a carbon atom.

According to the degree of arseniation, the reaction product is more or less soluble in apolar solvents, such as benzene, toluene, ether, carbon tetrachloride.

*Example II.*—Commercial paraffin of a melting point of about 55° C. is treated by bubbling dry chlorine gas through said paraffin at 70° C. until its chlorine content amounts to about 30% by weight. The product thus obtained is reacted with vigorous stirring at about 80° C. with a solution containing one mol of K₃AsO₃ for each atom of chlorine, and obtained by dissolving arsenious acid (H₃AsO₃) in the equivalent amount of 15% aqueous solution of KOH, for 1–4 hours. The reaction mixture is then allowed to cool and further treated as described in Example I.

*Example III.*—One part by weight of a chlorinated petroleum oil obtained by chlorinating a petroleum fraction boiling between 235° and 240° C. and containing monochlortetradecane is diluted by one part by weight of chloroform, and the diluted product is reacted under vigorous stirring at about 80° C. with a 15% aqueous solution of K₃AsO₃ containing one mol of K₃AsO₃ for one atom of chlorine for one hour. The reaction product is then allowed to cool, separated from the aqueous solution, thoroughly washed with hot water, and finally separated from the solvent by distillation.

The reaction products obtained in the above examples may be converted into trivalent arsenic compounds under the action of reducing agents. Arsen oxides may be obtained, for example, by the action of $SO_2$ at ordinary room temperature preferably in the presence of hydroiodic acid as a catalyst, while in halogen acid solution the corresponding arsen dihalides such as arsen dichlorides are formed. Treatment of the pentavalent arsenic compounds with sodium hydrosulfite or hypophosphorous acid leads to the corresponding arseno compounds, and treatment with hydrogen sulfide to the corresponding arsen sulfides.

Instead of the chlorinated products, other halogenated products such as hydrocarbons substituted by bromine or iodine may be used in the reaction with the arsenite solution. This reaction may be facilitated in some cases by using the halogenated hydrocarbon, particularly a hydrocarbon oil, in form of an aqueous emulsion obtained by emulsifying said oil in a diluted aqueous soap solution or by adding to the halogenated hydrocarbon or to the aqueous arsenite solution a suitable wetting agent, such as an alkali soap, stearamide or sulfonated oleic acid. Instead of the alkali metal salts other salts of the pentavalent arsenic compounds obtained in the above examples may be prepared.

The products obtained according to this invention may be used by themselves, or in mixture with other substances, and they may be used dissolved in oils or other suitable solvents or in the form of dispersions, such as emulsions. Solutions of the above described arsenic containing products in mineral oils, tar oils, particularly coal tar oils, or in mixtures of mineral oils and coal tar oils may be, for example, used. Such solutions may be prepared f. e. by dissolving the arsenic containing compounds in the oil solvent under moderate heating or by first dissolving said compounds in a volatile solvent, mixing the solution thus obtained with the oil, and removing, if desired, the volatile solvent by distillation.

It is to be understood that my invention is not limited to the specific embodiments presented herein for illustration, and is susceptible of numerous modifications within the scope and spirit of the invention as defined in the appended claims.

I claim:

1. As a new compound, a long chain paraffinic hydrocarbon compound of arsenic, said hydrocarbon compound being a solid paraffin containing at least one arsenic radical linked directly to a carbon atom of the chain, said arsenic radical corresponding to the formula $—(AsO_3M_2)$ wherein M represents the positive salt-forming radical of a water-soluble salt of arsenious acid.

2. As a new composition of matter, a mixture of long chain paraffinic hydrocarbon compounds of arsenic, said hydrocarbon compounds consisting of solid paraffin hydrocarbons having in the carbon chain of their molecule at least one arsenic radical linked directly to a carbon atom of the chain, said arsenic radical corresponding to the formula $—(AsO_3M_2)$ wherein M represents the positive salt-forming radical of a water-soluble salt of arsenious acid.

ERNST A. H. FRIEDHEIM.